United States Patent [19]

Keyworth et al.

[11] 4,153,452

[45] May 8, 1979

[54] RECOVERY OF METALS FROM BIMETALLIC SALT COMPLEXES

[75] Inventors: Donald A. Keyworth, Houston; Jerome R. Sudduth, Pasadena, both of Tex.

[73] Assignee: Tenneco Chemicals, Inc., Saddle Brook, N.J.

[21] Appl. No.: 923,761

[22] Filed: Jul. 11, 1978

[51] Int. Cl.$^2$ ............... C01G 7/34; C22B 15/12; C22B 11/04
[52] U.S. Cl. .................. 75/101 BE; 75/109; 75/117; 75/118 R; 423/24; 423/112; 423/127; 423/277
[58] Field of Search ............ 423/1, 23, 24, 42, 43, 423/112, 127, 277; 75/101 BE, 109, 117, 118; 260/438.1

[56] References Cited

U.S. PATENT DOCUMENTS

| | | | |
|---|---|---|---|
| 3,477,813 | 11/1969 | Fernald et al. | 423/127 |
| 3,678,112 | 7/1972 | Wollensak et al. | 423/127 |
| 3,758,606 | 9/1973 | Horowitz et al. | 260/438.1 |
| 3,960,910 | 6/1976 | Sudduth et al. | 260/438.1 |

Primary Examiner—Brian Hearn
Attorney, Agent, or Firm—Evelyn Berlow

[57] ABSTRACT

Metals are recovered from waste materials that contain an organic component and a bimetallic salt complex component that comprises complexes having the formula $M_IM_{II}X_n$.Aromatic and/or the formula $M_IM_{II}X_n.M_{II}OX$.Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic hydrocarbon or halogenated aromatic hydrocarbon having 6 to 12 carbon atoms, by hydrolyzing the waste material with dilute hydrochloric acid to form a hydrolysis mixture that separates into an organic phase and an aqueous phase, and, after removing the organic phase, adding to the aqueous phase sufficient aluminum or another reducing metal to precipitate the Group I-B metal. After the precipitated metal has been removed from it, the aqueous solution is treated with sufficient base to precipitate the Group III-A metal hydroxyide, which is recovered from the aqueous solution. This process can be used, for example, to recover copper and aluminum from waste materials that contain $CuAlCl_4$.toluene and/or $CuAlCl_4.AlOCl$.toluene.

10 Claims, No Drawings

RECOVERY OF METALS FROM BIMETALLIC SALT COMPLEXES

This invention relates to a process for the recovery of metals from waste materials that comprise bimetallic salt complexes having the generic formula $M_IM_{II}X_n$.Aromatic and/or the generic formula $M_IM_{II}X_n \cdot M_{II}OX_I$.Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic hydrocarbon or halogenated aromatic hydrocarbon having 6 to 12 carbon atoms. More particularly, it relates to a process for recovering copper and aluminum from waste materials that comprise cuprous aluminum tetrachloride complexes.

Bimetallic salt complexes that have the generic formula $$M_IM_{II}X_n \cdot \text{Aromatic}$$

are known to be useful in the separation from gas mixtures of such complexible ligands as olefins, acetylene, aromatics, and carbon monoxide. For example, in U.S. Pat. No. 3,651,159, Long et al. disclosed a process in which a liquid sorbent that was a solution of cuprous aluminum tetrahalide in toluene was used to separate ethylene, propylene, and other complexible ligands from a gas feedstream. The complexed ligands were recovered by ligand exchange with toluene. The resulting solution of cuprous aluminum tetrahalide.toluene in toluene was recycled and used to separate additional quantities of the complexible ligands from the feedstream. Walker et al. in U.S. Pat. No. 3,647,843 disclosed a process in which a hydrocarbon pyrolysis gas stream was contacted with a cuprous aluminum tetrachloride solution in toluene to separate acetylene from the gas stream as a solution of the complex HC≡CH.CuAlCl$_4$ in toluene. Acetylene was stripped from this complex with toluene, and the cuprous aluminum tetrachloride.toluene complex was recycled.

In processes such as those disclosed by Long et al. and Walker et al. in which a liquid sorbent containing a bimetallic salt complex is recycled without purification and is used for long periods of time, there is a gradual increase in the amounts of reaction by-products and other impurities in it until sufficient impurities are present to interfere with the efficient operation of the process. For example, when the liquid sorbent is contacted with a gas feedstream that contains an olefin having 2 to 4 carbon atoms, some of the olefin reacts with the aromatic hydrocarbon or halogenated aromatic hydrocarbon in the sorbent to form alkylated aromatic compounds, and some undergoes polymerization to form olefin oligomers. Any water that is present in the gas stream reacts with the bimetallic salt complex to form the complex $M_IM_{II}X_n \cdot M_{II}OX$.Aromatic, which has limited solubility in the liquid sorbent. When it contains amounts of these and other contaminants that are sufficient to coat heat exchangers, clog lines, and otherwise foul the equipment, the liquid sorbent must be purified, for example, by cooling to precipitate a sludge that comprises the slightly-soluble bimetallic salt complexes and separating this sludge from it, or replaced by fresh liquid sorbent.

When a Group I-B metal halide is reacted with a Group III-A metal halide in the presence of an aromatic hydrocarbon solvent to form the liquid sorbent, there is usually also formed a small amount of sludge that contains a major amount of the bimetallic salt complex $M_IM_{II}X_n \cdot M_{II}OX$, resulting from the presence of contaminants such as $M_{II}OX$ and water in the reactants. This sludge, which is only slightly soluble in the liquid sorbent, is removed before the sorbent is used to separate complexible ligands from gas feedstreams.

Because of their high metal contents, spent liquid sorbent, sludge separated from liquid sorbent, and sludge formed during the preparation of the liquid sorbent cannot be discharged into sewers or waste ponds without causing serious pollution problems. In addition, it is economically desirable to recover the metals, which are usually copper and aluminum, from the waste materials.

Several processes have been proposed for the recovery of metals from sludge and from spent liquid sorbents that contain the bimetallic salt complex $M_IM_{II}X_n$.Aromatic. In U.S. Pat. No. 3,845,188, Walker et al. disclosed a process in which the Group I-B metal in the spent liquid sorbent is recovered as its halide by contacting the liquid sorbent with anhydrous ammonia and separating from the sorbent the metal halide the precipitates. It has been proposed that the waste materials be burned, but since these materials contain about 30% of metal salts, this process leaves a substantial metal ash that must be disposed of in a manner consistent with environmental conservation. These processes are generally uneconomical and impractical to carry out on an industrial scale, and they may cause pollution problems.

This invention relates to an improved process for the recovery of metals from waste materials that comprise a bimetallic salt complex component that contains the complex $M_IM_{II}X_n$.Aromatic, the complex $M_IM_{II}X_n \cdot M_{II}OX$.Aromatic, or a mixture of these complexes and an organic component that contains an aromatic hydrocarbon, a halogenated aromatic hydrocarbon, an alkylated aromatic hydrocarbon, olefin oligomers, tars, or a mixture thereof. These waste materials may be spent liquid sorbent that has been used to remove complexible ligands from gas feedstreams, sludge separated from freshly-prepared liquid sorbent, or sludge separated from spent liquid sorbent. This process, which is more efficient and more economical to operate than that disclosed in U.S. Pat. No. 3,845,188 and which avoids the pollution problems associated with the previously-proposed processes, provides an environmentally-safe procedure for the disposal of waste materials that contain bimetallic salt complexes, and it provides an efficient procedure for the recovery of metals from these waste materials.

In the process of this invention, the bimetallic salt complex-containing waste material from which the metals are to be recovered is first hydrolyzed with dilute aqueous hydrochloric acid. The hydrolyzed material, which has a pH in the range of 1.8–2.3, separates into an upper organic phase and a lower acidic aqueous phase, which is drawn off for further treatment. The organic phase may be distilled to separate aromatic hydrocarbons from it, or it may be incinerated without causing pollution problems. The acidic aqueous phase is then treated with a metal that reduces the Group I-B metal ion in the solution to the free metal. After the removal of the precipitated metal from it, the acidic aqueous solution is brought to pH 5–7 by the addition of an alkali metal hydroxide, thereby forming the insoluble hydroxide of the Group III-A metal, which is recovered by settling and decantation or filtration. The supernatant liquid or filtrate, which contains soluble alkali metal salt, may be safely discarded.

The spent liquid sorbents from which the metals can be recovered by the process of this invention are solutions of bimetallic salt complexes in an aromatic hydrocarbon or a halogenated aromatic hydrocarbon that may contain alkylated aromatic hydrocarbons, alkylated halogenated aromatic hydrocarbons, olefin oligomers, other bimetallic salt complexes and/or tars. The bimetallic salt complexes in the liquid sorbents have the generic formula $M_IM_{II}X_n$.Aromatic and/or the generic formula $M_IM_{II}X_n \cdot M_{II}OX$.Aromatic. $M_I$ is a Group I-B metal; that is, copper, silver, or gold. Copper (I) is the preferred metal. $M_{II}$ is a Group III-A metal; that is boron, aluminum, gallium, indium, or thallium. Boron and aluminum are the preferred metals, aluminum being particularly preferred. X is halogen, i.e., fluorine, chlorine, bromine, or iodine; it is preferably chlorine or bromine. The sum of the valences of $M_I$ and $M_{II}$ is represented by n. Aromatic is a monocyclic aromatic hydrocarbon or halogenated aromatic hydrocarbon having 6 to 12 carbon atoms, preferably 6 to 9 carbon atoms, such as benzene, toluene, ethylbenzene, xylene, mesitylene, chlorobenzene, bromobenzene, iodobenzene, dichlorobenzene, dibromobenzene, chlorotoluene, bromotoluene, iodotoluene, or chloroxylene. It is preferably benzene or toluene. Illustrative of these bimetallic salt complexes are the following: $CuBF_4$.benzene, $CuBCl_4$.benzene, $AgBF_4$.mesitylene, $AgBCl_4$.xylene, $AgAlCl_4$.xylene, $AgAlBr_4$.bromobenzene, $CuGaCl_4$.toluene, $CuInI_4$.1,2-dichlorobenzene, $CuTlI_4$.p-chlorotoluene, and the like. The bimetallic salt complexes in the waste material is usually $CuAlCl_4$.benzene, $CuAlCl_4$.toluene, or $CuAlBr_4$.benzene. The aromatic hydrocarbon or halogenated aromatic hydrocarbon in which the bimetallic salt complex is dissolved is usually and preferably the same as that used in the preparation of the bimetallic salt complex, but if desired it may be a different one. The total amount of aromatic hydrocarbon or halogenated aromatic hydrocarbon in the liquid sorbent, that is, the amount in the bimetallic salt complex plus the amount used as solvent, is at least 10 mole percent of the amount of the bimetallic salt $M_IM_{II}X_n$ that is present. It is preferred that the amount of aromatic hydrocarbon or halogenated aromatic hydrocarbon be 100 to 450 mole percent of the amount of the bimetallic salt. The particularly preferred liquid sorbents contain 25 to 75 percent by weight of $CuAlCl_4$.benzene in benzene or $CuAlCl_4$.toluene in toluene.

The sludges from which the metals can be recovered by this process generally comprise a major amount of the bimetallic salt complex $M_IM_{II}X_n \cdot M_{II}OX$.Aromatic, which is usually $CuAlCl_4 \cdot AlOCl$.toluene, and a minor amount of an aromatic hydrocarbon, such as benzene or toluene. They may also contain other bimetallic salt complexes, such as $M_IM_{II}X_n$.Aromatic, which is usually $CuAlCl_4$.toluene or $CuAlCl_4$.benzene, organic reaction by-products, and tars.

In a preferred embodiment of this invention, the bimetallic salt complex-containing waste material from which metals are recovered is either (1) a liquid sorbent that is a solution of cuprous aluminum tetrachloride in benzene or toluene that has been used in a process for the removal of carbon monoxide, ethylene, or other complexible ligands from a gas feedstream until it contains an amount of such impurities as alkylated aromatic compounds, olefin oligomers, tars, $CuAlCl_4 \cdot AlOCl$, and other sorbent-insoluble bimetallic salt complexes that interferes with the efficient operation of the ligand separation process and necessitates the replacement of the liquid sorbent in the system, (2) a sludge that comprises bimetallic salt complexes formed by the reaction of cuprous aluminum tetrachloride with small amounts of water, hydrogen sulfide, amines, or alcohols that are present as contaminants in the gas feedstream and that has been separated from the cold liquid sorbent, or (3) a sludge that is formed during the preparation of the liquid sorbent and that comprises a major amount of $CuAlCl_4 \cdot AlOCl$ and minor amounts of $CuAlCl_4$ and either benzene or toluene. If the waste material contains a high concentration of tars, alkylated aromatic hydrocarbons, and/or olefin oligomers, it may be diluted with from one-half to twice its volume of an aromatic hydrocarbon to improve its handling and pumping characteristics before it is treated by the process of this invention. It is preferably diluted with an equal volume of toluene.

In the hydrolysis step of the process, the waste material is contacted with water that contains sufficient hydrogen chloride to convert substantially all of the copper and aluminum in the bimetallic salt complexes to their water-soluble chlorides. In most cases, from 5 parts to 50 parts by volume of 2% to 20% aqueous hydrochloric acid is used per part by volume of the waste material. Particularly good results have been obtained when 4 parts to 10 parts by volume of 5% to 15% aqueous hydrochloric acid was used per part by volume of the waste material. In order to obtain complete conversion of the metals to their chlorides, the pH of the hydrolysis mixture should be in the range of 1.8-2.3 and preferably 2.0.

When hydrolysis is complete, the hydrolysis mixture separates into an upper organic phase, that contains a major amount of benzene or toluene, and a lower aqueous phase, that contains copper and aluminum chlorides.

The organic phase, which is separated from the aqueous phase, for example, by decantation, may be distilled to recover the toluene or benzene, or it may be incinerated.

To the acidic aqueous phase is added a reducing agent that is a metal, such as aluminum iron, or magnesium, in an amount that is stoichiometrically equivalent to the amount of copper in the solution and that will cause substantially all of the copper to precipitate from the solution. The preferred reducing agent is aluminum because of its low equivalent weight. Only 9 pounds of aluminum is required to produce 63.5 pounds of copper, whereas 18 pounds of iron or 12 pounds of magnesium is required to accomplish the same result. In addition, aluminum is low in cost, and its use does not introduce another metal into the reaction products resulting from the metal-recovery process.

The precipitated copper that is recovered from the aqueous solution by decantation or filtration is quite pure and can be sent to copper processor for salvage.

The filtrate, which contains aluminum chloride and hydrochloric acid can be discarded without causing pollution problems. It is preferred, however, that the aluminum in it be recovered by adding to it sufficient alkali metal hydroxide to bring it to a pH in the range of 5 to 7 to cause the aluminum hydroxide to precipitate. Preferably a 10%-20% aqueous solution of sodium hydroxide is used to bring the filtrate to a pH in the range of 5 to 5.5. When the free-flowing slurry produced in this way settles, a clear supernatant liquid, which is an aqueous solution of an alkali metal chloride, which is usually sodium chloride, can be separated from the precipitated aluminum hydroxide and discarded. The recovered aluminum hydroxide can be used, for example, as a flocculating agent in the treatment of water.

The invention is further illustrated by the following examples. In these examples, all parts are parts by volume unless otherwise indicated.

EXAMPLE 1

A. A liquid sorbent that contained 28.6 mole percent of cuprous aluminum tetrachloride and 71.4 mole percent of toluene was prepared by adding 1.1 moles of cuprous chloride to 1 mole of anhydrous aluminum chloride in toluene. The resulting solution was filtered to remove unreacted cuprous chloride and insoluble impurities from it.

B. A gas mixture obtained by the pyrolysis of natural gas had the following composition:
Hydrogen: 560 mm.
Carbon monoxide: 280 mm.
Acetylene: 75 mm.
Methane: 60 mm.
Carbon dioxide: 25 mm.

The pyrolysis gas was fed at ambient temperature and 19 psia pressure to an absorption column in which it was contacted with an amount of the liquid sorbent of Example 1A that contained at least sufficient cuprous aluminum tetrachloride to react with all of the acetylene and carbon monoxide in the feed gas. The acetylene and carbon monoxide in the gas mixture reacted with the liquid sorbent as it traveled through the column to form a solution that contained the acetylene-cuprous aluminum tetrachloride complex and the carbon monoxide-cuprous aluminum tetrachloride complex. This solution was fed to a stripping column in which it was brought into contact with benzene vapor at 80° C. The mixture of benzene vapor and carbon monoxide that left the column was cooled to 25° C. to separate the carbon monoxide from the benzene. The sorbent solution which then contained cuprous aluminum tetrachloride and the acetylene-cuprous aluminum tetrachloride complex was fed to a stripping column in which it was brought into contact with benzene vapor at 95° C. The vapor that left the column was cooled to condense the benzene and separate it from the acetylene. The stripped sorbent was returned to the absorption column where it reacted with additional amounts of carbon monoxide and acetylene in the gas stream.

C. After it had been used for several months in the process described in Example 1B, the liquid sorbent which contained impurities that interfered with its use in the removal of carbon monoxide and acetylene from the gas stream was replaced by fresh liquid sorbent.

D. Twenty-five parts of the spent liquid sorbent, which had a specific gravity of 1.22, was added to a mixture of 15 parts of concentrated hydrochloric acid and 150 parts of water at room temperature. The reaction mixture, which had a pH of 2, separated into an upper phase that comprised 25 parts of toluene and a lower clear acidic aqueous phase.

The phases were separated, and the toluene phase was used to prepare fresh liquid sorbent.

Two parts by weight of powdered aluminum was added to the acidic aqueous phase. The copper that precipitated was collected and dried at 110° C. There was obtained 4.5 parts by weight of copper.

The filtrate, which contained 4 ppm of copper, was diluted to 200 parts with water and then neutralized to pH 5 by the addition of 20 parts of 15% aqueous sodium hydroxide solution to produce a free-flowing slurry. After the slurry had settled for an hour, the clear supernatant liquid, which was an aqueous sodium chloride solution, was separated from the precipitated aluminum hydroxide.

EXAMPLE 2

Twenty-five parts of a sludge that comprised $CuAlCl_4.AlOCl$, $CuAlCl_4$.toluene, toluene, alkylated toluenes, and tars was diluted with 25 parts of toluene. The resulting solution was added slowly to a mixture of 10 parts of concentrated hydrochloric acid and 100 parts of water. The reaction mixture separated immediately into two phases. The upper phase, which contained organic compounds, was separated and incinerated.

To the acidic aqueous phase was added one part by weight of powdered aluminum in two increments. Thirty minutes after the aluminum had been added, the precipitated copper was separated from the aqueous solution. The filtrate contained 4 ppm of copper.

Sufficient 20% aqueous sodium hydroxide solution was added to the filtrate to bring its pH to 5.5. The aluminum hydroxide that precipitated was allowed to settle and then collected. The clear supernatant liquid was discarded.

This process can be used in a similar way to recover metals from the other bimetallic salt complex-containing waste materials disclosed herein.

What is claimed is:

1. The process for the recovery of metals from waste materials that comprise a bimetallic salt complex component selected from the group consisting of complexes having the formula $M_IM_{II}X_n$.Aromatic, complexes having the formula $M_IM_{II}X_n.M_{II}OX$.Aromatic, and mixtures thereof, wherein $M_I$ is a Group I-B metal, $M_{II}$ is a Group III-A metal, X is halogen, n is the sum of the valences of $M_I$ and $M_{II}$ and Aromatic is a monocyclic aromatic hydrocarbon or halogenated aromatic hydrocarbon having 6 to 12 carbon atoms, and an organic component selected from the group consisting of monocyclic aromatic hydrocarbons having 6 to 12 carbon atoms, halogenated aromatic hydrocarbons having 6 to 12 carbon atoms, alkylated aromatic hydrocarbons, olefin oligomers, tars, and mixtures thereof that comprises the steps of (a) contacting said waste material with an amount of dilute aqueous hydrochloric acid sufficient to form a hydrolysis mixture having a pH in the range of 1.8–2.3;

(b) allowing the hydrolysis mixture to separate into an upper organic phase and a lower aqueous phase that is an aqueous solution of $M_I$ chloride and $M_{II}$ chloride;

(c) separating said organic phase from said aqueous solution;

(d) adding to the aqueous solution an amount of a metal that is stoichiometrically equivalent to the amount of $M_I$ chloride in the solution, said metal being selected from the group consisting of aluminum, iron, and magnesium, thereby causing $M_I$ to precipitate;

(e) separating precipitated $M_I$ from the aqueous $M_{II}$ chloride solution;

(f) adding to the aqueous $M_{II}$ chloride solution sufficient alkali metal hydroxide to bring it to a pH in the range of 5 to 7, thereby causing $M_{II}$ hydroxide to precipitate from the aqueous alkali metal chloride solution; and (g) recovering precipitated $M_{II}$ hydroxide from said solution.

2. The process of claim 1 wherein the bimetallic salt complex component of the waste material is selected from the group consisting of $CuAlCl_4$.toluene, $CuAlCl_4$.benzene, $CuAlCl_4$.AlOCl.toluene, $CuAlCl_4$.AlOCl.benzene, and mixtures thereof.

3. The process for the recovery of copper and aluminum from waste materials that comprise a bimetallic salt complex component selected from the group consisting of $CuAlCl_4$.Aromatic $CuAlCl_4$.AlOX.Aromatic, and mixtures thereof, wherein Aromatic is a monocyclic aromatic hydrocarbon or halogenated aromatic hydrocarbon having 6 to 12 carbon atoms, and an organic component selected from the group consisting of monocyclic aromatic hydrocarbons having 6 to 12 carbon atoms, monocyclic halogenated aromatic hydrocarbons having 6 to 12 carbon atoms, alkylated aromatic hydrocarbons, olefin oligomers, tars, and mixtures thereof that comprises the steps of (a) contacting said waste material with an amount of dilute hydrochloric acid sufficient to form a hydrolysis mixture having a pH in the range of 1.8 to 2.3;

(b) allowing the hydrolysis mixture to separate into an upper organic phase and a lower aqueous phase that is an aqueous solution of cuprous chloride and aluminum trichloride;

(c) separating the organic phase from said aqueous solution;

(d) adding to the aqueous solution an amount of aluminum that is stoichiometrically equivalent to the amount of cuprous chloride in the solution thereby causing copper to precipitate;

(e) separating precipitated copper from the aqueous aluminum trichloride solution;

(f) adding to the aqueous aluminum trichloride solution sufficient 10%–20% aqueous sodium hydroxide solution to bring it to a pH in the range of 5 to 7, thereby causing aluminum hydroxide to precipitate from the aqueous sodium chloride solution; and (g) separating aluminum hydroxide from said aqueous sodium chloride solution.

4. The process of claim 3 wherein in Step (a) the waste material is contacted with sufficient dilute aqueous hydrochloric acid to form a hydrolysis mixture having a pH of 2.

5. The process of claim 3 wherein the Step (a) the waste material is contacted with from 2 parts to 50 parts by volume of 2% to 20% aqueous hydrochloric acid per part by volume of the waste material.

6. The process of claim 3 wherein the Step (a) the waste material is contacted with from 4 parts to 10 parts by volume of 5% to 15% aqueous hydrochloric acid per part by volume of the waste material.

7. The process of claim 3 wherein in Step (f) sufficient 10%–20% aqueous sodium hydroxide is added to the aqueous aluminum trichloride solution to bring it to a pH in the range of 5 to 5.5.

8. The process of claim 3 wherein the waste material is diluted with from one-half to twice its volume of an aromatic hydrocarbon before it is contacted with dilute hydrochloric acid in Step (a).

9. The process of claim 3 wherein the waste material is diluted with an equal volume of toluene before it is contacted with dilute hydrochloric acid in Step (a).

10. The process of claim 3 wherein the bimetallic salt complex component of the waste material is selected from the group consisting of $CuAlCl_4$.toluene, $CuAlCl_4$.benzene, $CuAlCl_4$.AlOCl.toluene, $CuAlCl_4$.AlOCl.benzene, and mixtures thereof.

* * * * *